March 24, 1970   M. HAY, JR   3,502,114
FLEXIBLE DUCT

Filed Jan. 29, 1968   2 Sheets-Sheet 1

INVENTOR
MALCOLM HAY JR.

BY Chisholm and Spencer
ATTORNEYS

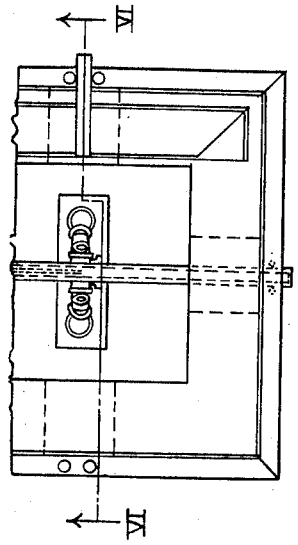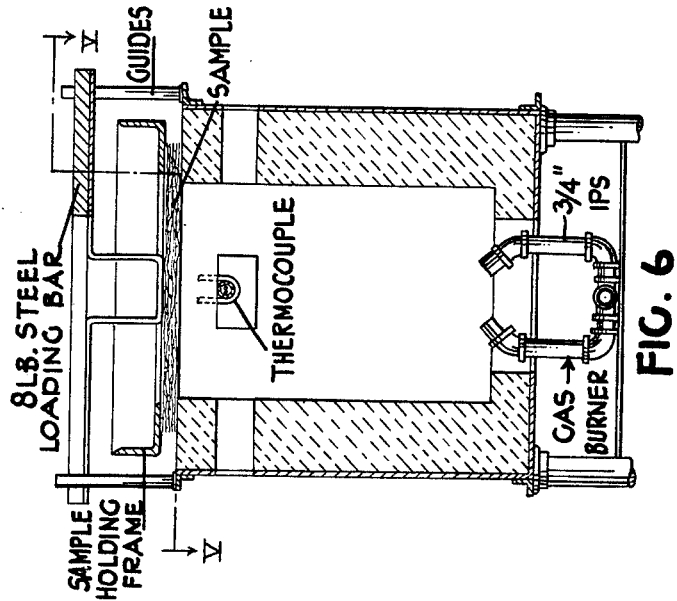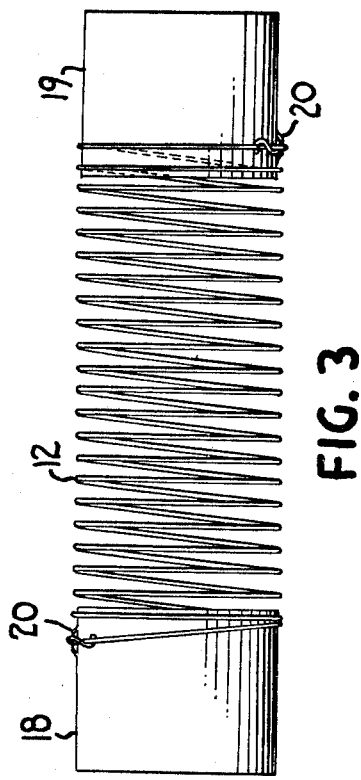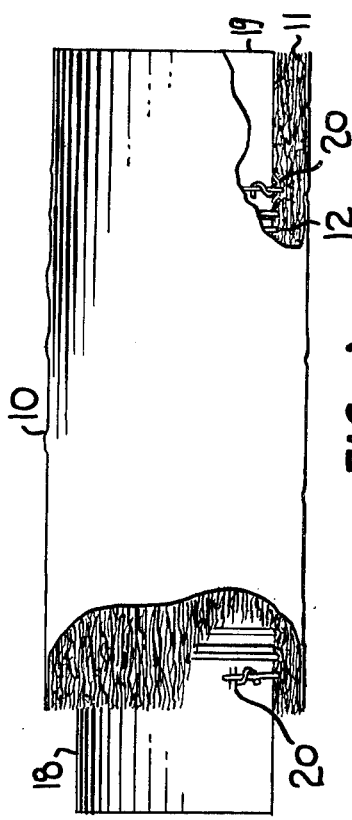

United States Patent Office 3,502,114
Patented Mar. 24, 1970

3,502,114
FLEXIBLE DUCT
Malcolm Hay, Jr., Pittsburgh, Pa., assignor to PPG Industries, Inc., Pittsburgh, Pa., a corporation of Pennsylvania
Continuation-in-part of abandoned application Ser. No. 414,984, Dec. 1, 1964. This application Jan. 29, 1968, Ser. No. 701,301
Int. Cl. F16l 11/02
U.S. Cl. 138—129                                   24 Claims

ABSTRACT OF THE DISCLOSURE

A flexible insulated duct produced by forming a continuous wire helix about a mandrel, securing connectors to each end of said wire helix, wrapping a coherent, strand-individual fiber insulating material about said helix, adhering said insulating material to said wire helix and disposing a flexible sleeve about said insulating material and said helix.

CROSS-REFERENCE TO RELATED APPLICATIONS

This application is a continuation-in-part of my application Ser. No. 414,984, filed Dec. 1, 1964, now abandoned entitled "Flexible Duct."

BACKGROUND OF THE INVENTION

This invention relates to a flexible insulated duct for the conduction of gaseous fluids. More particularly, the present invention relates to a flexible insulated duct which exhibits superior strength and fire-retardant properties.

The principal use contemplated for the duct of the present invention is as a conduit for the movement of air of controlled temperature from one place to another. It has become common construction practice to provide buildings with central heating and/or air conditioning systems. In such centrally located temperature controlling systems, some means must be adopted to conduct the heated or cooled air from the central source to the various different parts of the building. This is accomplished using various types of air ducts. The types of ducts used in the past for this purpose have been of two general types. These two general types are (1) a rigid, roughly rectangular type of duct, usually fabricated of galvanized sheet metal, and (2) a flexible type of duct similar to that herein disclosed. The normal installation of both types of ducts has been within the ceilings, walls, or between the floors of the structure being heated or cooled.

The type of duct to be used should be capable of transmitting the heated or cooled air, without a substantial change in temperature. This requires that the duct be insulated. Another desirable characteristic for the duct is flexibility, i.e., twistability, to enable installation of the duct work around corners in restricted areas such as in the floors, walls or ceilings of a building.

Flexible ducts in the past have seen limited use as compared to the rigid types of ducts usually fabricated of galvanized steel sheeting, even though they are easier to install, because of their greater cost per linear foot. The higher cost of flexible ducts, coupled with their characteristically poor air flow (static friction) characteristics, has offset the flexibility advantage in the minds of many potential users.

In copending U.S. patent application Ser. No. 257,196 now Patent No. 3,216,459, entitled "Flexible Insulated Duct," filed Feb. 8, 1963, by Clifford A. Schroeder and Quentin L. Clark, there is disclosed a type of insulated flexible duct, together with its method and apparatus of manufacture. The manufacture of the duct therein disclosed begins with the formations of a dimensionally unstable, wire helix about a collapsible mandrel. A blanket of porous insulating material is then wrapped about the wire helix and adhered to it by an adhesive. The adhesive serves to maintain the spacing of the convolutions of the wire helix. The entire blanket and wire helix are then encased by a flexible, fluid impermeable sleeve. The insulating material preferred is composed of individual, fine glass fibers bonded to each other by a thermosetting resinous binder, so as to have a density of about 0.5 to 1.0 pound per cubic foot. The binder is a phenol formaldehyde resin and is originally sprayed on the fibers in liquid, curable form and thereafter heat cured. The binder has a molecular weight of about 125 to 325. Such an insulating material and its method of manufacture is shown in U.S. Patent No. 2,489,243.

The insulating material disclosed in U.S. Patent No. 2,489,243 is composed of extremely fine glass fibers ranging in diameter from 0.00003 to 0.00020 of an inch and having a composition and physical properties the same as or similar to the glass disclosed in U.S. Patent No. 2,640,784. The length of the individual glass fibers ranges from ½ to 8 inches. The binder constitutes about 16 to 22 percent of the final blanket by weight. The insulating blanket is normally fabricated for this application to have a density ranging from 0.5 to 1.0 pound per cubic foot but can be fabricated to exhibit a density up to 1½ pounds per cubic foot. This insulating material exhibits a tensile strength of about 6 pounds per square inch in the longitudinal direction and 2 pounds per square inch in the transverse direction of the blanket formation.

The individual glass fibers are generally haphazardly oriented in the blanket, but they do tend to be oriented predominantly perpendicular to the longitudinal axis of the final duct. This orientation of the fibers tends to resist circumferential expansion of the flexible duct, while still permitting sufficient longitudinal flexing of the duct. This material permits bending of the duct without producing undesirable surface bulging of the compressed fibers.

The wire helix, since it is dimensionally unstable in the longitudinal direction, must be bonded to the insulating blanket to maintain the spacing between convolutions. The bond between the wire helix and the insulating blanket must be sufficiently strong to permit flexing and unflexing of the duct without collapse or decreasing the internal cross-sectional area of the duct to restrict fluid flow.

The present invention is concerned with an improved flexible duct of the type described above. More particularly, it has been discovered that by using an insulating blanket material consisting of a composite of individual glass fibers and glass fiber strands, a flexible duct having improved fire retardance, strength and flexural characteristics is produced. An improved bond is achieved between the helix and the composite insulating blanket. The improved duct, because it maintains the cross-section even though the duct is bent through a considerable angle, has good air flow characteristics even in a severely bent condition.

The insulating material employed in the improved duct of the present invention is a composite of individual glass fibers and glass fiber strands in which each component is randomly oriented and uniformly distributed throughout the other. The strands and individual fibers are strongly bonded to the wire helix by suitable organic resinous adhesives. The strand-fiber composite blanket material develops increased strength in the final duct because of its ability to adhere its mass to the helical wire element of the duct while at the same time maintaining a strong internal bond between the various components of the blanket material.

In an insulated duct utilizing individual fine fibers alone, the bond between the wire helix and the surface portions of the insulating blanket is much stronger than the bond between the surface portions of the blanket material and the rest of the blanket mass. The fine individual fibers of the surface of the blanket materials composed of individual fibers only tended to be pulled apart and away from the rest of the blanket when the duct was flexed. In other words, the bond between the fibers and the helix was stronger than the bond between individual fibers themselves. This resulted in the helix element being separated from the main portion of the blanket element of the duct, and this decreased the structural strength of the duct. In the present invention, the strands of the insulating blanket material provide a stronger, more cohesive blanket base which does not easily pull apart and thus cause separation of the insulating blanket element from the helical wire element of the duct.

In the best mode of the invention contemplated, the insulating material employed in the improved duct of the present invention consists of about 10 percent by weight individual glass fibers scrap material and 90 percent by weight glass scrap textile and roving strands. The strand content can range from 60 to 100 percent by weight of the total weight of the blanket, however, and still develop the advantages of the present invention. At least 50 percent and preferably above 75 to 90 percent by weight of the fibers, both individual and strand, are composed of the compositions described in U.S. Patents Nos. 2,334,961 and 2,571,074.

The individual fiber component preferably consists of fibers ranging from 0.00003 to 0.00075 of an inch in diameter, but may incorporate fibers from 0.00001 to 0.0015 of an inch in diameter. The individual fiber lengths preferably range from 2 to 8 inches, but may vary from ½ to 12 inches.

The strand component preferably ranges from 0.0048 to 0.0311 of an inch in diameter, but may vary from 0.0030 to 0.0500 of an inch. The length of the strands preferably is from 2 to 8 inches, but may vary from ½ to 12 inches.

The strand preferably is composed of between 102 and 800 individual fibers, but may contain from 50 to 1600 individual fibers, the individual fibers which are used to make the strands preferably range from 0.00009 to 0.00075 of an inch in diameter, but may vary from .00005 to .0015 of an inch.

The binder used in the fabrication of the strand may be any conventional binder.

The strands preferably contain from 0.01 to 2.0 percent by weight of binder of the total strand weight.

The binder used in the fabrication of the strand-fiber composite is BRP-4400 phenol formaldehyde, manufactured by Union Carbide Corporation of New York, N.Y. The total amount of binder present in the final strand-fiber composite material preferably is about 21.0 percent by weight of the total weight of the material, but may vary from about 16.0 to 29.0 percent by weight. To incorporate this total amount of binder in the strand-fiber composite material only requires preferably the addition of about 17.5 percent by weight binder, which binder addition may also vary from 12 to 25 percent by weight. Due to the binder content of the strand and fiber starting materials, including bonded fine binder fiber insulation scrap, this reduced binder addition produces the preferred total binder content in the finished composite material.

The strand-fiber composite preferably is fabricated to have a density from ½ to 1 pound per cubic foot, but the density may vary from ¼ to 3 pounds per cubic foot. The strand-fiber composite characteristically exhibits a tensile strength of 10 pounds per square inch in the longitudinal direction and 7 pounds per square inch in the transverse direction of the blanket formation.

Broadly, the method of fabrication of the duct incorporating the preferred fibrous insulating material of the present invention is that disclosed in copending application, Ser. No. 257,196, mentioned above. The fabrication begins with coating the wire helix material with an adhesive and forming it into the helix by wrapping the wire about a collapsible mandrel. The wire helix element is fixed during fabrication of the duct by tying off the ends of the wire at each end of the collapsible mandrel. The insulating blanket material is sprayed with an adhesive and is then wrapped about the helix the desired number of times. The wrapped insulating blanket material is then stapled along the longitudinal axis of the duct to hold it in place. A flexible, essentially non-expandable, fluid impermeable sleeve is then pulled over the blanket and wire helix complex. The mandrel is then collapsed to release the completed duct.

A strand-fiber composite material preferred as the insulating blanket in the present invention is disclosed in U.S. Patent 2,477,555 issued to Richard M. Roberts and Theodore H. Metzler, July 26, 1949.

According to this patent, the strand-fiber composite material is produced by drawing, sizing and collecting glass fibers to form a strand. The strand thus formed is collected on a revolving package drum using conventional fiber glass strand forming, sizing and collecting techniques. The strand package is then removed from the package drum and cut lengthwise. The cut strands are then removed from the cut package as a compact mass of essentially uniform strand lengths, which approximately equal the circumference of the winding package. Due to the manner of winding and removal of the strands from the package, the strands are oriented substantially parallel in the compact mass.

This mass of strands is then fed into a chopper apparatus which cuts and breaks up the mass of strands into shorter lengths. The cutting or chopping operation is conducted until the fiber strand lengths are reduced to the desired average length. The chopped strands are then passed through a picker apparatus which tears apart some of the strands into their individual fibers. The extent of strand separation is dependent upon the number of times the strand material is passed through the picker apparatus. The product thus produced is a composite of untorn, unseparated strands interspersed uniformly and randomly throughout a mat of randomly oriented, finely separated, individual glass filaments. After the desired ratio of strands to filaments has been produced, a powdered curable thermosetting binder is applied to the composite and cured to bind the strands and fibers together and produce the final insulating mat or blanket. The molecular weight of the cured binder is about 400 to 600.

The objects and advantages of this invention will become more evident from a consideration of the description of the drawings in which:

FIG. 3 is a view of a duct of this invention with its insulation material and flexible outer sleeve removed to show one means of stabilizing the ends of the wire helix by fastening the ends of the wire helix to male and female metal connectors affixed to the ends of the duct;

FIG. 4 is a view, partly broken away, of the finished duct of FIG. 3 showing insulating material completely covering the female connector and partly covering the male connector, and a flexible sleeve disposed about the insulating material;

FIG. 5 is a view along the line V—V of FIG. 6 showing details of a furnace that may be used to determine fire retardant properties of the duct of this invention; and FIG. 6 is a view along the line VI—VI of the furnace of FIG. 5.

Figure 1:
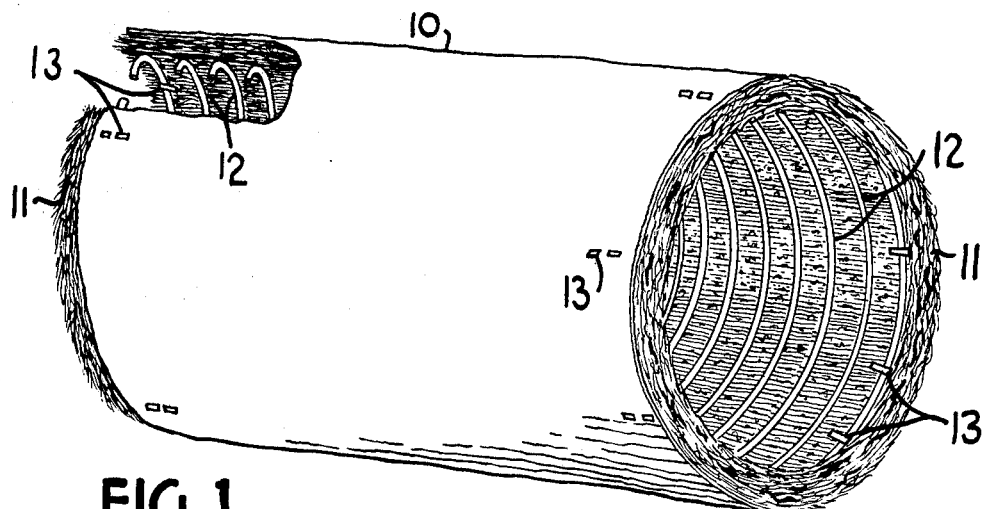
FIG. 1 is a pictorial view, partly broken away, of a short section of a flexible insulated duct of this invention.

In FIG. 1 are shown the basic structural components of the flexible duct: the sleeve 10, the strand-fiber insulating blanket 11, and the wire helix 12. At each end of the flexible duct the wire helix is shown adhered to the sleeve and through the insulation blanket by staples 13.

Other methods of stabilizing the ends of the wire helix can be used, such as fastening them to metal connectors affixed to the ends of the duct. The wire helix is bonded to the insulating blanket by an adhesive which has been sprayed on the blanket and by an adhesive coating all along the length of the wire helix.

Figure 2:
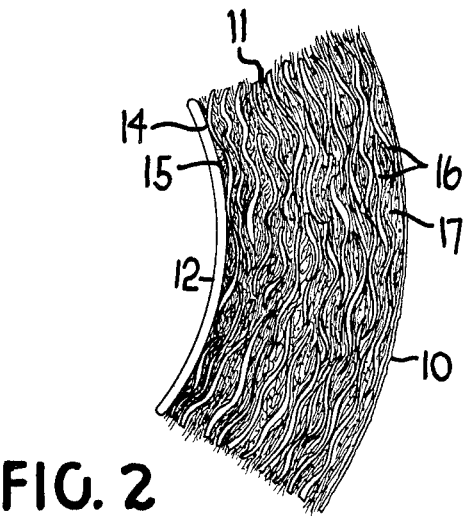
FIG. 2 is a greatly enlarged, partial, circular cross-section of the duct of FIG. 1.

FIG. 2 is a partial, circular cross-section of the flexible duct showing a greatly enlarged view of the relationship between the three structural elements: the sleeve 10, the insulating blanket 11 and the wire helix 12, as well as the relative positions of the strands and fibers of the insulating blanket. A single strand to wire helix bond is labeled 14. In the insulating blanket material, the strands are indicated as 16 and the fine individual fibers are indicated as 17. The bond between a point on the wire helix and a portion of the insulating blanket at which a fine filament is bonded to the wire helix is labeled 15.

FIGS. 3 and 4 show the wire helix fastened to metal connectors or couplings 18 and 19. As will be understood, the metal connectors or couplings provide means on the ends of the duct for fixing and stabilizing the ends of the wire, as well as means for attaching one section of duct to another or to other coupling members. In the embodiment shown, the male connector 18 and the female connector 19 both comprise a galvanized sheet metal sleeve or stove-pipe type coupling of cylindrical cross-section. For suitable resistance to atmospheric corrosion, the zinc coated (galvanized) sheet steel and steel wire used in the construction of the duct of this invention preferably has a uniform zinc coating of about 0.3 ounce per square foot of surface area coated (0.6 ounce per square foot of sheet) as determined by the Standard Method of Test for Weight of Coating on Zinc-Coated (Galvanized) Iron or Steel Articles, ASTM designation A90–53.

Projecting from the outer surface of the sleeve, there is shown an open tab or loop 20 that forms an integral part of the sleeve and is preferably produced by a simple stamping operation, such as by punch-pressing a small portion of the sleeve material outwardly from the remainder of the sleeve material. As shown, the ends of the wire helix are inserted through the loops 20 and the wire is then twisted on itself to firmly secure the ends of the wire to the connectors, and thereby stabilize the ends of the wire helix. As will be apparent from FIG. 4, it is desirable that the finished duct section have its insulating material and flexible sleeve essentially completely covering the female connector 19 and only partly covering the male connector 18, so that when joined with other duct sections or the like there is provided an essentially continuous cylindrical covering of insulating material and sleeve material about the duct. Additionally, the flexible sleeve material 10 may be somewhat longer than the insulating material 11 and the extra length of material may be folded back on itself at one end of the duct section so that by unfolding this extra length, there is provided an overlap of sleeve material 10 at each joint between adjacent duct sections. This lap joint of sleeve material is preferably taped to enhance the desired vapor impermeability of flexible duct construction.

In the present invention, the adhesive applied to the wire helix and sprayed on the blanket prior to fabrication to bond the helix to the strand-fiber composite may be any conventionally used adhesive, although a non-flammable type is preferred for safety considerations. Non-flammable adhesives are preferred also because they are frequently required by local building codes and ordinances. The adhesive used should remain flexible even after setting so that the duct may be flexed without permanently damaging the bond as may occur during installation of the duct. The adhesive used should also have a composition which does not attack or corrode the strand-fiber composite material of the insulation blanket.

The preferred adhesive is Fuller 9093, a neoprene elastomer and resin adhesive manufactured by the H. B. Fuller Company of St. Paul, Minn. Suitable alternative adhesives include a combination of LS356M and LS357M, a chlorinated rubber adhesive, manufactured by the Better Finishes and Coatings Company of Clifton, N.J., and Milligan 6764, a latex which is manufactured by the J. G. Milligan Company of Milwaukee, Wis. The latter adhesive is a water-base adhesive exhibiting improved flame retardation characteristics.

The same adhesive may be used on the blanket material as that applied to the wire helix. The only modification made is that the adhesive is thinned somewhat so it may be easily sprayed on the blanket composite.

In the present invention, many different materials can be used to produce the helix element of the duct. It is preferred that the helix be fabricated of a material and of a convenient size to exhibit the following properties. The helix material should possess sufficient strength and rigidity to prevent collapse of the duct in a radial direction upon application of moderate pressures, but should not be so strong as to adversely affect the flexibility of the duct. The helix material should also be sufficiently elastic to cause spring-back of the duct to its original shape as soon as external deforming pressures on the duct are relaxed. The desired helix material should exhibit then a balance of good flexibility, elasticity and strength. Any material roughly conforming to the form of a slender rod of wire, composed of metal, plastic or a combination thereof, having a circular or non-circular cross-section exhibiting a suitable balance of these characteristics, can be used.

Galvanized, hard drawn, steel, spring wire has been found to be an excellent helix material. For ducts less than about 7 inches in inside diameter, a galvanized wire 0.039 inch in diameter is preferred. For ducts between 8 and 9 inches in inside diameter, a wire 0.041 inch in diameter is preferred. Ducts 12 to 18 inches in inside diameter should use a wire diameter of 0.05 inch.

The range of usable wire diameters as a function of helix diameter is fairly broad. The preferable range occurs when the helix diameter is between 110 and 360 times the diameter of the wire. A usable range occurs whenever the helix diameter is between 40 and 400 times the diameter of the wire. A helix diameter lower than 40 times the diameter of the wire results in a configuration which acts as a compression coil spring exhibiting too great a rigidity. A helix diameter greater than 400 times the diameter of the wire results in a configuration which is dimensionally unstable in the axial or longitudinal direction of the duct. In the present invention, the preferred duct design is one in which the insulation blanket provides the principal longitudinal strength and dimensional stability and the wire helix provides the principal radial or collapse strength of the duct.

In all duct sizes, the preferred spacing of the convolutions of the wire helix is ⅜ of an inch from center to center, although the spacing may range from ¼ to ¾ of an inch and still produce a suitable duct.

The sleeve material can comprise any flexible substantially non-expandable material such as polyvinyl chloride. The preferred sleeve material of the present invention is TI43, a grey 3.0–3.35 mils thick extruded polyvinyl chloride tubing manufactured by Goodyear Tire and Rubber Company of Akron, Ohio. Suitable alternative sleeve materials include ED908 manufactured by Clopay Corporation of Cincinnati, Ohio, and AV1059 manufactured by Goodyear Tire and Rubber Company, both of which are extruded polyvinyl chloride tubing, 4 mils thick and grey in color. Other materials, such as Saran, manufactured by Dow Chemical Company of Midland, Mich., which is a polyvinylene chloride film, Foil-Scrim-Vinyl, manufactured by Toscony Company of Passaic, N.J., which is a polyvinyl chloride film and fiber glass scrim fabric material and various neoprene impregnated glass cloths may also be used.

It is also not required that the duct of the present invention have a circular cross-section. It is within the scope of the present invention and within the techniques of fabrication to produce ducts having oval or even rectangularly shaped cross-sections.

To demonstrate the increased fire-retardant properties of the ducts fabricated in accordance with the present invention over that exhibited by ducts fabricated using a fine fiber glass insulating blanket material, various samples of each type of duct were subjected to the Underwriters' Laboratories Incorporated Standard Fire-Retardant Test. The details and procedures of the test, as reproduced hereinbelow with reference to FIGS. 5 and 6, are given in "Standards for Safety," Air Ducts, UL 181 First Edition, November 1961 on pp. 8–10.

Fire-retardant test

Fire-retardant tests are to be conducted using a refractory-lined gas-fired combustion chamber open at the top. The sample to be tested is to be used to form the top of the chamber, thus forming a test furnace such as that shown in FIGS. 5 and 6.

The furnace is to be equipped with a dual outlet gas burner with manual input control as shown in FIGS. 5 and 6. The gas burner is not to have any means for premixing of gas and combustion air.

The furnace is to be vented directly into the room space in which it is located by means of the four vent openings shown. No dampers or regulators are to be employed in openings provided for inlet of combustion air or for venting.

The furnace temperature is to be determined by a No. 16 or 18 AWG protected thermocouple located at the midpoint of the horizontal area formed by the four sides of the furnace and at an elevation 3 inches below the underside of the test sample forming the furnace top. The thermocouple is to be supported within a ½-inch IPS steel pipe section.

A furnace having the configuration shown by FIGS. 5 and 6, equipped with the inlet air and vent openings illustrated, and using a gas burner as detailed is to burn only natural gas or preferably methane to assure similar combustion and flame characteristics.

The room in which the test furnace is to be located is to be large in relation to the furnace and may be ventilated if such ventilation is accomplished without appreciable air movement in the vicinity of the furnace.

The test sample is to be at least 18 inches square. The material surface which is considered to be the outside surface of the air duct is to be the surface to be exposed to the flame during the test. The edges of the test sample are to be weighted or otherwise held securely to the top refractory surfaces of the furnace sidewalls, using a frame such as that shown in FIGS. 5 and 6.

The test sample is to be subjected to an 8-pound static load during the test. The static load is to have a bearing surface on the sample of 1 by 4 inches, which load is to be applied at the geometric center of the sample as exposed to the flame.

Prior to the beginning of a test, the furnace is to be fired for a period of at least 30 minutes, using a section of ⅜-inch asbestos millboard to form the top of the furnace combustion chamber. The input to the gas burner is to be adjusted as quickly as possible to obtain an indicated thermocouple temperature of 1400° F., and minor adjustments are to be made during this and any subsequent preheating period to maintain the flame at this temperature.

At the end of the preheating period, the asbestos millboard is to be removed and the air duct test sample immediately substituted in its place. The static load is to be placed on the sample. The gas input to the furnace is not to be disturbed during this change-over and any subsequent test period.

The test is to be continued for a period of 30 minutes for Class 0 and Class 1 air ducts, and 15 minutes for Class 2 air ducts. The test period is to be measured from the time the static load is applied to the test sample.

The sample shall withstand the fire-retardant test without collapse, evidence of perforation to an extent which would allow the direct passage of flame or gases, and without ignition occurring on the surface of the sample exterior to the combustion zone of the test furnace.

Thus, the Fire-Retardant Test is a measure of how long a material can resist the penetration of flame or gases and consists generally of subjecting an 18-inch square sample of the material to a combination of high temperature and static load. The test temperature is 1400° F. and the static load is 8 pounds. The load is applied over a rectangularly shaped bearing surface 1 x 4 inches located roughly in the center of the test sample. The length of time the material withstands the combined effects of high temperature and load determines its rating for various uses.

To pass the Fire-Retardant Test, the sample must sustain, without collapse, without evidence of perforation to an extent which allows the direct passage of flame or gases, and without ignition of the surface of the sample exterior to the combustion zone of the test furnace the combined effects of high temperature and static load referred to above.

The insulating materials composed of fine fibers only, having thicknesses ranging from ½ to 2 inches and densities ranging from ½ to 1½ pounds per cubic foot, consistently failed to withstand the combined effects of high temperature and static load in the standard test referred to above for a period of 30 minutes.

The samples tested were fabricated of fine fibers ranging from 0.00020 to 0.00024 of an inch in diameter. The samples contained about 21 percent by weight binder.

Samples of the insulating material used in the fabrication of the improved duct of the present invention were tested in the same manner as the fine filament materials. The test results are presented below in Table I.

TABLE I

| Material and No. of layers | Thickness, inches | Density, lbs./ft.³ | Time to failure, minutes and seconds |
|---|---|---|---|
| Glass-strand-filament composite single layer. | 0.53 | 1.74 | No failure at 60 minutes. |
| Do | 0.58 | 1.39 | Do. |
| Do | 0.59 | 1.45 | Do. |
| Do | 0.96 | 0.79 | 45:00. |
| Do | 0.99 | 1.02 | No failure at 60 minutes. |
| Do | 1.03 | .81 | Do. |
| Do | 1.09 | .79 | 20:00. |
| Do | 1.09 | .75 | 58:00. |
| Do | 1.10 | 1.03 | No failure at 60 minutes. |
| Glass-strand-filament composite double layer. | 1.23 | 1.29 | Do. |
| Do | 1.22 | 1.43 | Do. |
| Do | 1.00 | 1.14 | Do. |

As seen in the test data presented above, the duct of the present invention exhibits superior combined static load and fire-retardant characteristics. The improved duct, so long as it incorporates at least a 1-inch thickness of the strand-fiber composite which has a density of at least ¾ to 1 pound per cubic foot, will consistently meet the Fire-Retardant UL 181 standard test.

The improved fire-retardant characteristics are believed to be due to one or a combination of the following factors. The strands have a tendency to be flattened out and with their greater dimension than an individual fiber, they exert some baffling of the flame and thus make it more difficult for the flame to penetrate the fibrous mass. Also, it takes longer for the flame to melt a strand than an individual fiber due to their compact arrangement and mass and also due to the higher softening and melting temperature of the glass from which glass fiber strands are conventionally made for textile and resin reinforcement uses. The use of a powdered binder of higher molecular weight also aids in contributing to the high fire-retardant characteristics of the novel duct.

The improved fire-retardant duct of the present invention also retains the desired flexibility, ease of installation, good air flow characteristics, competitive price and the desirable acoustical characteristics of the earlier flexible duct designs.

Although the present invention has been discussed with regard to a particular method of manufacture and a particular insulating blanket material, the scope of the present invention should not be so limited. Other duct designs and means of fabrication may be devised which make use of the teachings of the present invention. The scope of the present invention should only be limited by the language of the appended claims.

What is claimed is:

1. A flexible insulated duct comprising a continuous wire helix, a coherent, fire-retardant, strand-individual fiber composite insulating material wrapped about said helix, means affixing each convolution of the helix to adjacent strands of the insulating material so that said insulating material resists being pulled apart and separated from said helix under axial loading of the duct, and a flexible, fluid impermeable sleeve about said insulating material and said helix.

2. A flexible insulating duct comprising a continuous wire helix, a fire-retardant insulating material composed predominantly of randomly oriented, essentially uniformly distributed strands bonded to each other wrapped about said helix, means affixing each convolution of the wire helix to adjacent strands of the insulating material so that said insulating material resists being pulled apart and separated from said helix under axial loading of the duct and a flexible, fluid impermeable sleeve about said insulating material and said wire helix.

3. A flexible insulating duct comprising a continuous wire helix having spaced apart convolutions, a coherent, fire-retardant, strand-fiber composite insulating material composed of randomly oriented, essentially uniformly distributed strands interspersed throughout a mass of randomly oriented and essentially uniformly distributed individual fibers wrapped about said helix, means affixing each convolution of the wire helix to adjacent strands of the insulating material so that said insulating material resists being pulled apart and separated from said helix under axial loading of the duct and a flexible, fluid impermeable sleeve about said insulating material and said wire helix.

4. A flexible insulating duct comprising a continuous wire helix having spaced apart convolutions, a fire-retardant, strand-fiber composite insulating material composed of randomly oriented, essentially uniformly distributed strands bonded to each other and interspersed throughout a mass of randomly oriented and essentially uniformly distributed individual fibers bonded to each other and the strands, said insulating material being wrapped about said helix and forming a substantial portion of the interior surface of the duct, means affixing each convolution of the wire helix to adjacent strands of the insulating materail so that said insulating material resists being pulled apart and separated from said helix under axial loading of the duct, and a flexible fluid impermeable sleeve about said insulating material and said wire helix.

5. A flexible insulating duct comprising a continuous wire helix having spaced apart convolutions, a coherent, fire-retardant, strand-fiber composite insulating material composed of randomly oriented, essentially uniformly distributed strands interspersed throughout a mass of randomly oriented and essentially uniformly distributed fibers wrapped about said helix, said insulating material forming a substantial portion of the interior surface of the duct, said strands comprising a plurality of substantially parallel fibers bonded in close proximity to each other, means affixing each convolution of the wire helix to adjacent strands of the insulating material so that said insulating material resists being pulled apart and separated from said helix under axial loading of the duct, and a flexible sleeve about said insulating material and said wire helix of sufficiently small inside diameter to partially compress said insulating material to produce a substantially uniform blanket thickness along the length of the duct.

6. A flexible insulating duct, according to claim 5, in which the strand-fiber composite insulating material is fabricated from fiber glass.

7. A flexible insulating duct, according to claim 6, in which the wire helix material is between 0.02 and 0.07 inch in diameter.

8. A flexible insulating duct, according to claim 7, in which the fibrous insulating material has a density of at least ¾ pound per cubic foot.

9. A flexible insulating duct, according to claim 6, in which the spacing of the convolutions of the wire helix is from ¼ to ¾ of an inch.

10. A flexible insulating duct, according to claim 9, in which the means affixing the wire helix to the insulating material comprises a non-flammable adhesive.

11. A flexible insulating duct, according to claim 6, wherein connector members are affixed to each end of said wire helix and said insulating material extends past said wire helix to essentially completely cover the outer surface of one of said connector members and to partially cover the outer surface of the other of said connector members.

12. A flexible insulated duct comprising a continuous wire helix, a connector member affixed to at least one end of said wire helix, fire-retardant insulating material wrapped about said helix and means affixing the insulating material to the helix.

13. A flexible insulated duct, according to claim 12, wherein connector members are affixed to each end of said wire helix and said insulating material extends over said wire helix to essentially completely cover the outer surface of one of said connector members and to partially cover the outer surface of the other of said connector members.

14. A flexible insulated duct, according to claim 13, wherein the insulating material comprises a coherent, strand-individual fiber, glass fibrous material.

15. A flexible insulated duct, according to claim 14, wherein the means affixing the wire helix to the insulating material comprises a non-flammable, elastomeric adhesive.

16. A flexible insulated duct, according to claim 12, which further includes a flexible sleeve about said insulating material and said helix and said flexible sleeve comprises a film of fluid impermeable material and fiber glass scrim fabric.

17. A flexible insulated duct comprising a continuous wire helix, connector means secured to each end of said wire helix, a coherent, fire-retardant, strand-individual fiber insulating material wrapped about said helix, means affixing the strand of said insulating material to each convolution of said wire helix so that said insulating material resists being pulled apart and separated from said helix under axial loading of the duct and a flexible sleeve disposed about said insulating material and said helix.

18. A flexible insulated duct, according to claim 17, wherein said flexible sleeve comprises a fiber reinforced, fluid impermeable material.

19. A flexible insulated duct, according to claim 12, wherein said insulating material has a thickness of at least 0.53 inch.

20. A flexible insulated duct, according to claim 12, wherein connector members are affixed to each end of said wire helix.

21. A flexible insulated duct, according to claim 12, which further includes a flexible, fluid impermeable sleeve about said insulating material and said wire helix.

22. A flexible insulated duct, according to claim 12, wherein connector members are affixed to each end of said wire helix and a flexible, fluid impermeable sleeve is disposed about said insulating material and said wire helix.

23. A flexible insulated duct, according to claim 12, wherein said means affixing the insulating material to the helix comprises a flexible, fluid impermeable sleeve disposed about said insulating material and said wire helix.

24. A flexible insulated duct, according to claim 12, wherein connector members are affixed to each end of said wire helix, the diameter of said wire helix is between 40 and 400 times the diameter of the wire, said insulating material wrapped about said helix comprises a glass fibrous material having a density of at least ¼ pound per cubic foot and a thickness of at least 0.53 inch, said insulating material extends over said wire helix to essentially completely cover the outer surface of one of said connector members and to partially cover the outer surface of the other of said connector members, said means affixing the insulating material to the helix comprises a non-flammable, elastomeric adhesive, and a flexible, fluid impermeable sleeve is disposed about said insulating material and said wire helix.

References Cited

UNITED STATES PATENTS

| | | | |
|---|---|---|---|
| 2,477,555 | 7/1949 | Roberts et al. | 154—28 |
| 3,216,459 | 11/1965 | Schroeder et al. | 138—139 |

LAVERNE D. GEIGER, Primary Examiner

HENRY K. ARTIS, Assistant Examiner

U.S. Cl. X.R.

138—109